United States Patent [19]

Kronenberg

[11] Patent Number: 5,053,624
[45] Date of Patent: Oct. 1, 1991

[54] RADON CONTROL SYSTEM

[76] Inventor: Stanley Kronenberg, Hollow Rd., Skillman, N.J. 08558

[21] Appl. No.: 553,837

[22] Filed: Jul. 18, 1990

[51] Int. Cl.⁵ .......................... H01J 47/00; G01T 1/18
[52] U.S. Cl. .................................. 250/385.1; 250/253; 250/255; 250/374.1; 324/464
[58] Field of Search .................... 324/71.4, 464, 469; 340/632; 250/374, 253, 385.1, 255

[56] References Cited

U.S. PATENT DOCUMENTS

| | | | |
|---|---|---|---|
| 3,093,738 | 6/1963 | Mann et al. | 250/374 |
| 3,878,496 | 4/1975 | Erickson | 250/374 |
| 3,984,690 | 10/1976 | Marshall, III et al. | 250/374 |
| 4,218,297 | 8/1980 | Henault et al. | 204/424 |
| 4,527,064 | 7/1985 | Anderson | 250/374 |
| 4,804,847 | 2/1989 | Uber, III | 250/374 |
| 4,859,854 | 8/1989 | Kershner et al. | 250/374 |
| 4,868,546 | 9/1989 | Dumkeck | 324/469 |
| 4,905,579 | 3/1990 | Dame | 98/1.5 |

FOREIGN PATENT DOCUMENTS 99630  6/1983  Japan .................................. 98/42.04
1189233  6/1988  U.S.S.R. ............................. 250/324

OTHER PUBLICATIONS

The Journal Friday Home Report, 6/2/89, p. 26, "Electronic Radon Detectors are Effective", Dulley.

Primary Examiner—Kenneth A. Wieder
Assistant Examiner—Maura K. Regan
Attorney, Agent, or Firm—Michael Zelenka; William H. Anderson

[57] ABSTRACT

A detector of ambient radon concentrations in real time comprising a housing, at least three conductive elements one of which being grounded, another being biased with respect to the other conductive elements, and at least one other conductive element being connected in series with an amplifier circuit and a counter circuit, respectively. In operation, when an energized alpha particle enters the housing, it ionizes air molecules, thus producing ions which are collected by the conductive element by virtue of the potential between that element and the other elements. The voltage pulse is amplified by the amplifier circuit and then counted.

1 Claim, 3 Drawing Sheets

RADON CONTROL SYSTEM

GOVERNMENT INTEREST

The invention described herein may be manufactured, used, and licensed by or for the Government of the United States for governmental purposes without the payment to me of any royalties.

FIELD OF THE INVENTION

The present invention relates generally to the technology of radon detectors and particularly to radon detectors that continually monitor radon levels in ambient air.

BACKGROUND OF THE INVENTION

It is well known that radon, a radioactive gas formed by the radioactive decay of radium, actinium, or thorium, poses a significant health hazard to humans if they are exposed to radon gas in quantity. Recently, it has been discovered that radon gas seeps into homes and other structures from radioactive element sources found in the earth. Once in the home, the radon attaches to air-borne particles which may be inhaled. Continual exposure to radon over four picoCuries per liter of ambient air breathed is believed to significantly increase the incidence of lung cancer.

It is well known that adequate ventilation of lower floors of structures alleviates the harmful radon concentrations. Thus, most homes with unsafe radon concentrations may be made livable merely with adequate ventilation.

Currently, there are four ways in which to detect and determine radon concentrations. All of these methods are derived from alpha particle detection methods which are: the scintillation counter, the gas counter including both Geiger and proportional types, the solid state junction counter, and the activated charcoal detector.

The scintillation counter wa historically the first utilized in early experiments on radioactivity. The scintillator was viewed with a microscope to count the individual flashes of light produced by each alpha particle stopping event. In the modern scintillation type counter, the scintillation material is disposed on a photocathode of a photomultiplier tube which amplifies the signal and provides information about the energy of the alpha particle. An analyzer is then required for analysis of the analog signal from the multiplier to count the alpha particles present. The coating of the scintillator must be opaque to prevent the admission of ambient light into the system. To accomplish this, the coating must be very thin making it susceptible to scratches which lead to "light leaks". The use of a scintillator for radon detection has heretofore been described by Madnick et al, U.S. Pat. No. 4,984,535 issued Jan. 16, 1990. The Madnick device, as described, would be expensive to manufacture, would be susceptible to "light leaks", and would require calibration.

Gas-filled alpha particle detectors use a specific gas as the detector material depending upon whether the mode of operation is a Geiger counter or an ionization/proportional counter. In either case, the working gas for alpha or radon detection is hermetically sealed. Entrance to the ionization zone by the incoming alpha particle is through a thin, fragile plastic or metal window. The output signal pulse is constant in the Geiger counter operation but is related to the energy of the alpha particle in the ionization and proportional counter operations. The existence of delicate windows for the entrance apertures for the incoming alpha particles make the ga filled counters unsatisfactory for continual use because the window may be easily damaged.

The junction counter is a solid state p-n junction with a reverse bias which collects ionization charges from passage of an alpha particle through the depletion layer. It can be made compact and portable. The limitation of the junction counter lies in the stringent requirements for avoiding scratching and abrasion of the metallic electrode surface of the detector. This electrode is light sensitive and the coating serves to block ambient light; thus it can be easily scratched resulting in a "light leak". Equally important, the active surface must be free from moisture and dust.

Another means for detection of radon concentrations is the activated charcoal detector. This method, however, is not adaptable for continual monitoring of radon concentrations in real time.

From this it is evident that the radon detection methods, currently available, have intrinsic deficiencies which make them impractical to monitor ambient radon concentrations in real time. The present invention, however, remedies these deficiencies by providing a rugged radon detector that monitors ambient radon concentrations in real time. Further, the present invention needs no calibration means to distinguish between alpha particles, beta particles or gamma rays as the present invention is only capable of monitoring alpha particle disintegrations from radon as well as from other radioactive sources.

SUMMARY OF THE INVENTION

It is the primary objective of the present invention to provide a low cost radon detector capable of continually monitoring ambient radon concentrations in real time. Another objective of the present invention is to warn the occupant of a monitored area of unsafe radon concentrations or to alleviate an unsafe radon concentration by ventilating the area automatically.

The real time ambient radon detector disclosed herein, in its preferred embodiment, includes a housing; a plurality of wire screens interspaced and fitted in the housing, the outer most wire screen being grounded, at least one inner wire screen being connected to a power source, and a separate medial wire screen being connected to an amplifier circuit; and a counter circuit in series with the amplifier circuit.

In operation, the voids in the wire screens permit the ambient air including the alpha particles emitted by radon gas to enter the housing. The inner wire screen is biased negatively with respect to the outer grounded wire screen. Therefore, when alpha particles enter the chamber through the voids in the wire screens, the alpha particles release energy within the chamber producing ions in the ambient air. The ionization of the air by the alpha particles, therefore, is converted to an electric charge by the applied voltages. Electric charge accumulates on the separate medial wire screen producing a voltage pulse at the input of an integrated circuit. After amplification, the resulting voltage pulse is distributed to the counter circuit which, in turn, is distributed to the relay circuit. Each energetic alpha particle which enters the housing and which is stopped produces an individual voltage pulse. Due to this one to one ratio, no calibration of the device is necessary. The device ignores low LET particles such as beta-rays and gamma-rays as has been experimentally varified.

Because the present invention needs no delicate surface as found in other real time alpha particle and radon detectors, the detector disclosed herein can be ruggedly and compactly constructed, is portable, is simple to operate and maintain, and detects alpha particles with a hundred percent efficiency meaning that the present invention is capable of detecting every alpha particle entering the chamber.

DETAILED DESCRIPTION THE PREFERRED EMBODIMENT

Figure 1:
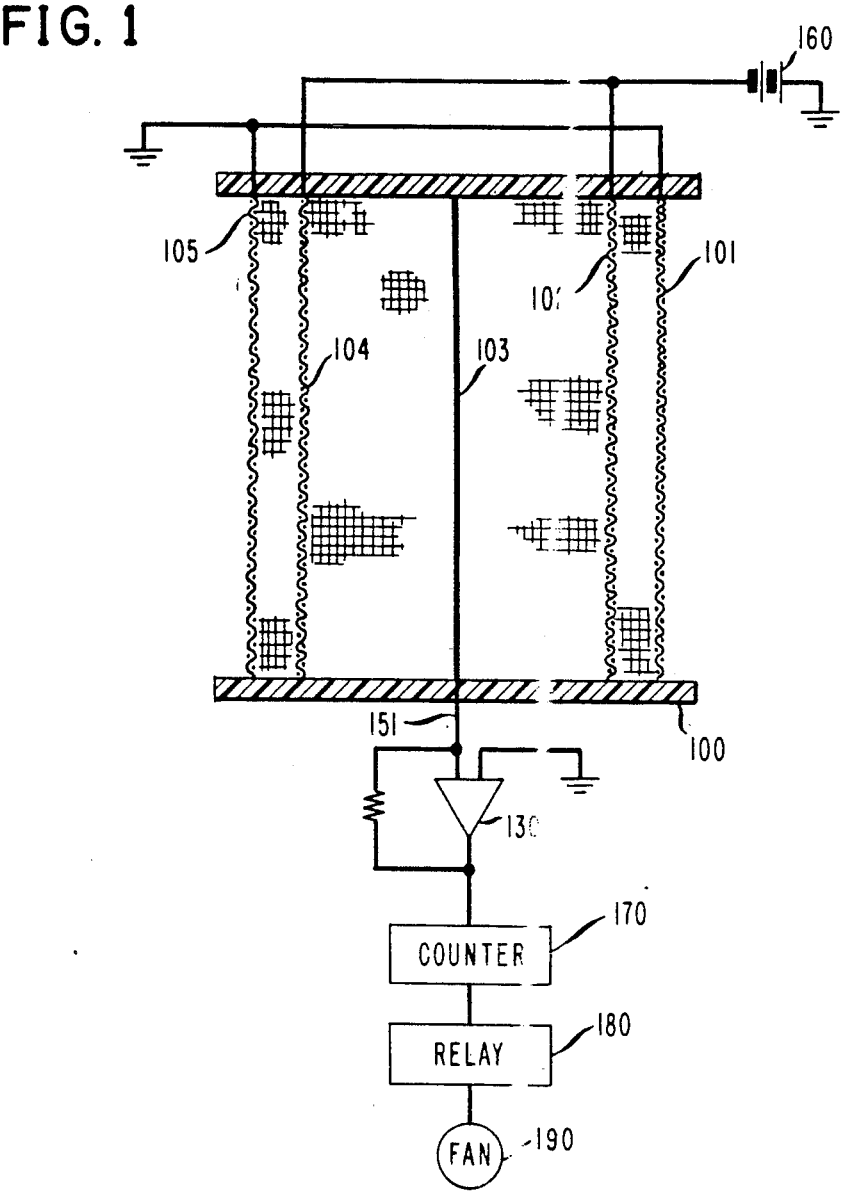
FIG. 1 is a diagram of a cylindrical radon detector which embodies the present invention.

With reference to FIG. 1, energetic alpha particles enter the cylindrical housing 100 through wire screens 101, 102, 103, 104, 105. The outer wire screens 101 and 105 are grounded and the inner wire screens 102 and 104 are biased with respect to the outer wire screens 101 and 105 and the medial wire screen 103 by a battery 160. The potential difference between the inner wire screens 102 and 104 and the medial wire screen 103 produces an electrical field which collects the negative ions on the medial wire screen with the battery polarity shown. Ions collected on the medial wire screen 103 produce a voltage on the medial wire screen 103 which is given by the formula:

$$V_p = E(eV)/32 \times 1.6 \times 10^{-19} \times 1/C \text{ Volts} \quad (1)$$

wherein E is the energy lost by the radon particle in the detector and C is the capacitance of the collector. The energy E is typically 3 MeV and the capacitance C is approximately $2 \times 10^{-12}$ F. Consequently, the typical pulse height is 7.5 mV. This pulse decays with a built in time constant $\uparrow = RC$, wherein R is the resistance of the integrated circuit 130. The voltage pulse from a radon particle collection event is delivered to the base of the integrated circuit which is connected in an emitter follower configuration so that an amplified signal is delivered through output lead 151.

The bias potential with respect to the chassis is imposed on the inner wire screen 102 and 104 to eliminate extraneous currents which may be created by chemical vapors and moisture and which may effect the input bias. Therefore, this feature makes the invention particularly applicable to environments with high moisture, chemical vapor or particle laden atmosphere such as may be found in a basement of a house.

Once the voltage pulse is amplified it is counted by a counter circuit 170. The counter circuit then adds the counts of radon particle disintegrations for a predetermined time period. If the count of radon particle disintegrations exceeds a predetermined number for a predetermined time period, a signal is then sent to the relay 180 which activates the exhaust fan 190. The predetermined number may be any number; however, it is recommended that it be no greater than the number of radon particle disintegrations that would occur for a concentration of radon equal to 4 pico Curries per liter of ambient air or 0.00222 disintegrations per minute per cubic centimeter.

Figure 2:
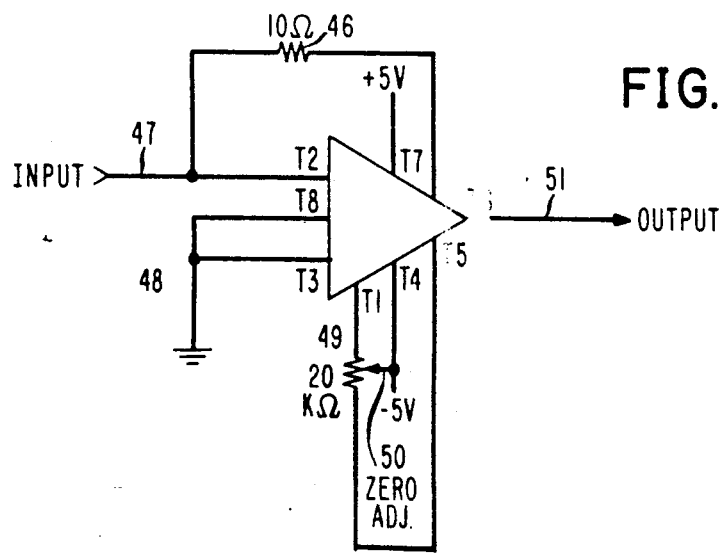
FIG. 2 is a circuit schematic for the connections of an electrometer integrated circuit in the embodiment of FIG. 1.

FIG. 2 shows the connection diagram for an electrometer integrated circuit, for example ICH 8500, which is well suited for incorporation into embodiments of the present invention. Terminal T1 is connected through resistors 46 and 49 to terminal T2 and the input 47. Example values of resistors 46 and 49 are $10^{10}$ and $5 \times 10^4$ ohms, respectively. Resistor 49 is a potential dividing resistor in a zero adjust rheostat. Terminals T3 and T8 are connected to a ground. A shielded cable output 51 is connected to terminals T5 and T6.

Figure 3:
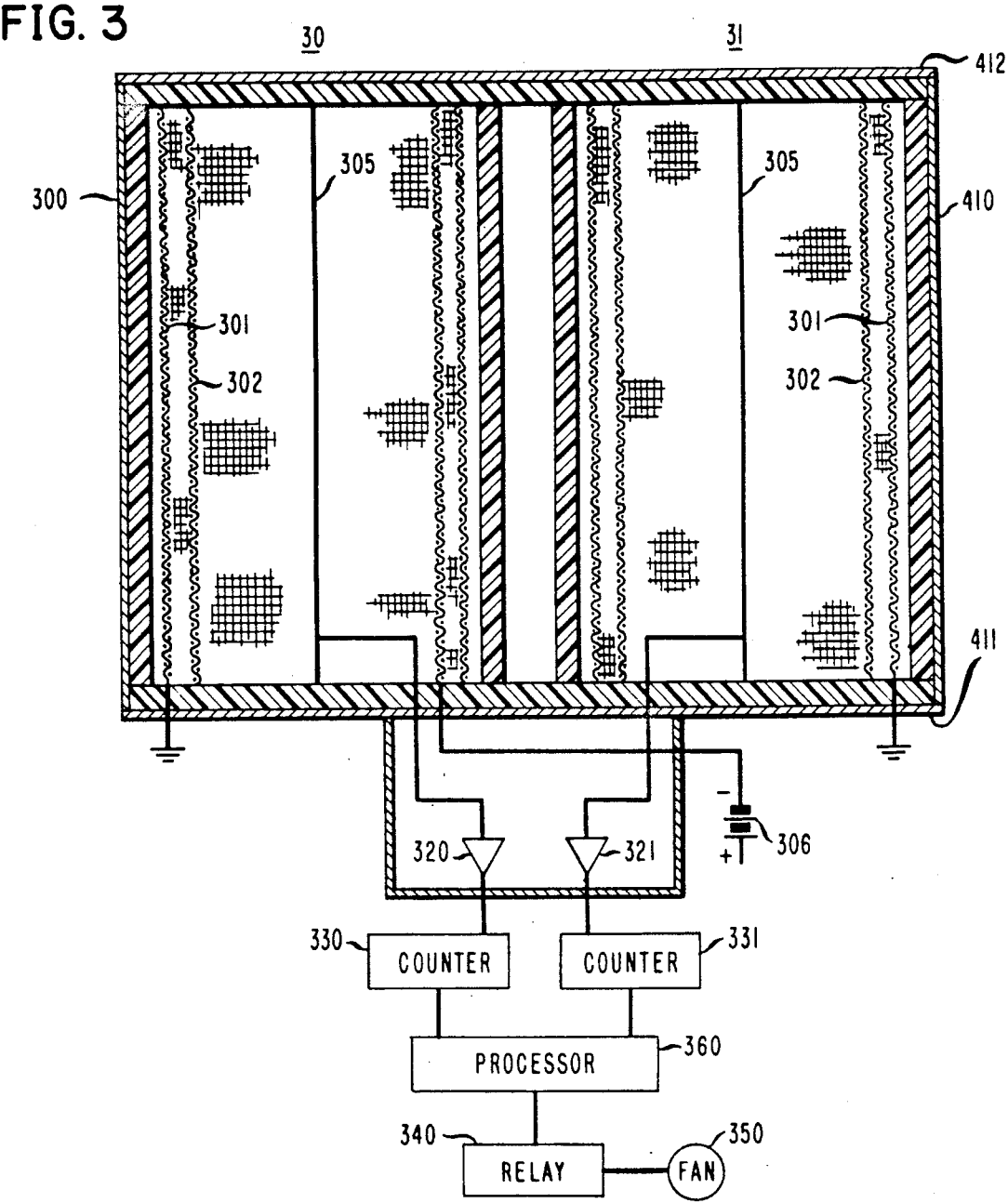
FIG. 3 is a diagram of a cylindrical radon detector which embodies the present invention and compensates for heavy particle interference.

The present invention as described above will detect and count all alpha particles including those from radon and from other radioactive sources as well as other heavy particles from sources such as cosmic radiation. Although these particles will effect humans in all the same manner, it may be advantageous to detect only radon disintegrations. FIG. 3 is a diagram of a radon detector embodying the present invention which exclusively detects radon disintegrations. As shown, there are two radon detectors fabricated substantially in the manner described above. One detector is permitted to operate in ambient air and the other is hermetically sealed and left inoperational for approximately two weeks. The hermetically sealed detector must be cleared of radon to function correctly. Because 222 radon has a half life of 3.8 days, the detector must be inactivated for a duration of time in order to permit any radon trapped in the hermetically sealed detector to decay. Once the sealed detector is cleared of all radon, it will detect all disintegrations caused by heavy particles excluding radon. The detector exposed to ambient air, however, will count all the ion discharges caused by the disintegration of heavy particles including radon disintegrations. The difference between the counts of the respective detectors will then be equal to the number of radon disintegrations in ambient air.

Figure 4:
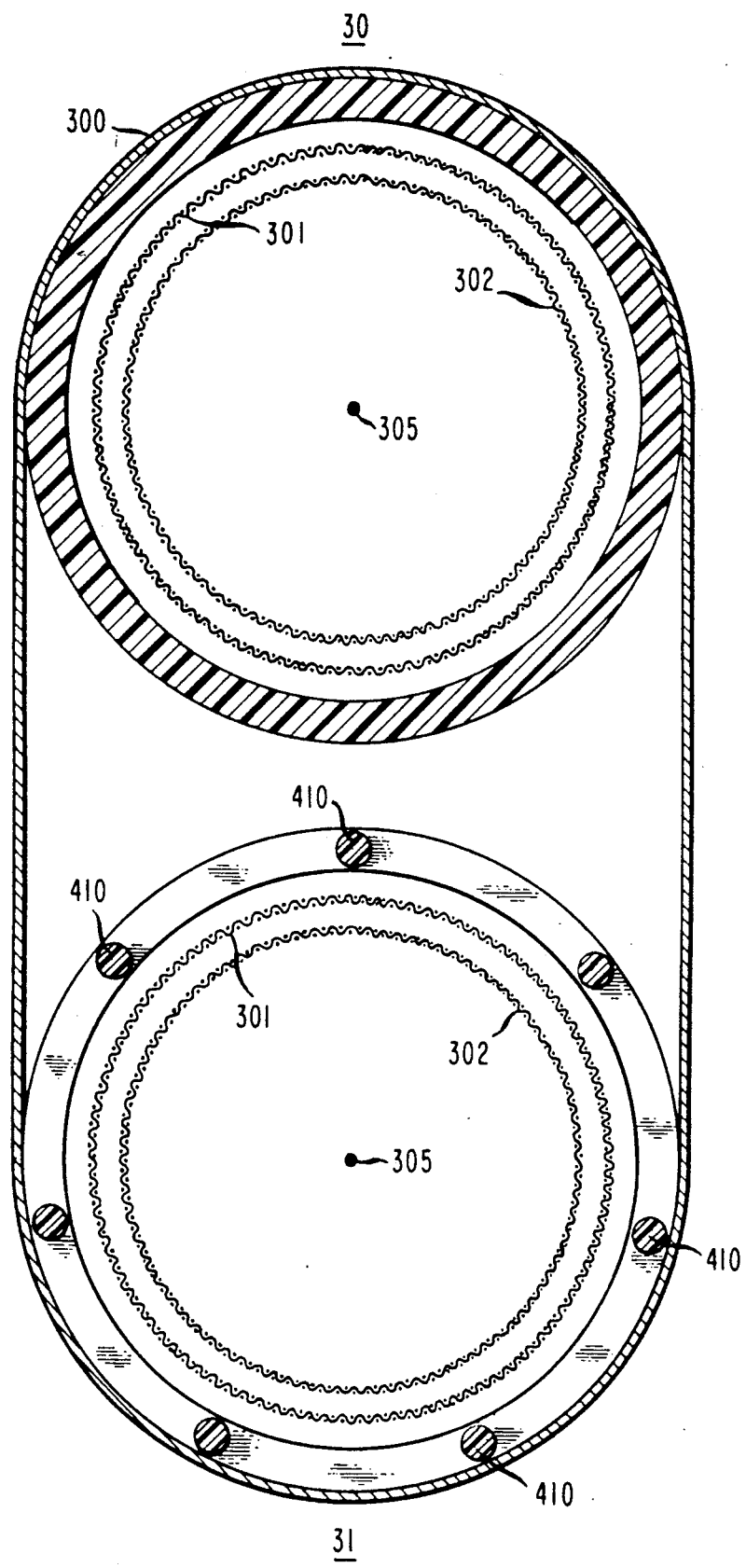
FIG. 4 is a cross-section diagram of the embodiment illustrated in FIG. 3.

As shown in FIG. 3, the hermetically sealed detector 30 may be constructed such that the housing 300 is formed by any air tight material, such as lucite piping sealed at either end by a sealant and lucite paneling. The grounded outer screen 301 is then formed within the housing 300. The inner biased screen 302 is formed within the outer screen as shown and biased by a power source 306 with the polarity shown. The medial screen of FIG. 1 may be replaced by a conductive rod 305 concentrically arranged within the housing 300. The conductive rod 305 is then connected to an integrated/emitter follower circuit 320, as described above, which in turn is connected to the counter circuit 330, relay circuit 340 and exhaust fan 350. The detector exposed to ambient air 31 varies from the hermetically sealed detector 30 only in the respect that the housing 400 permits the free flow of ambient air. As illustrated in FIG. 4, this may be accomplished through the use of rods 410 connecting a floor 411 and ceiling 412.

In operation, the hermetically sealed detector 30 will produce voltage pulses only from the disintegration of heavy particles excluding radon sources; the exposed detector 31, however, will produce voltage pulses for all heavy particle disintegrations. After the respective voltage pulses are amplified by the respective integrated circuits 320 and 321, the voltage pulses are counted by respective counter circuits 330 and 331. Thereafter, the differences of the respective counts is calculated by processor 360. If the difference of the counts is greater than a predetermined number for a predetermined time period, the relay circuit 340 is triggered which, in turn, activates the exhaust fan 350.

Although the alpha particle detector and/or radon detector as described above is susceptible to microphonic interference (due to the suggested integrated circuitry), it is not anticipated that this interference will pose any problem for the function of the preferred embodiment of the present invention. However, in areas such as commercial settings that generate microphonics it would advantageous to compensate for this interference.

Figure 5:
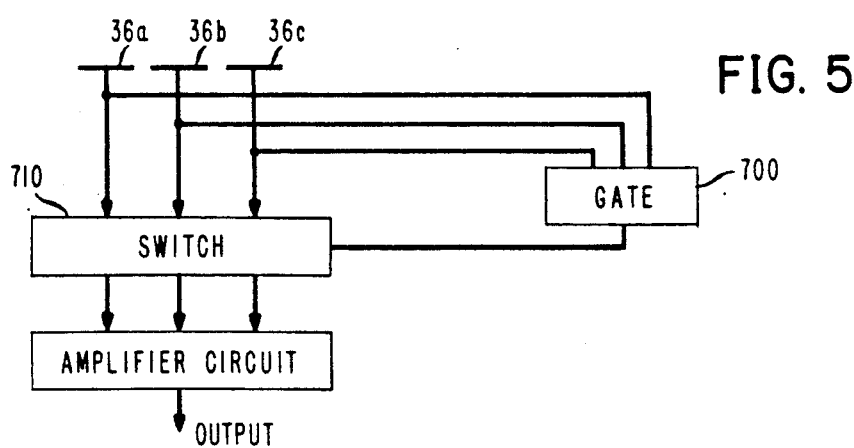
FIG. 5 is a schematic representation an alternate embodiment of either FIG. 1 or FIG. 3 which compensates for microphonic interference.

FIG. 5 is an alternate embodiment of the present invention that compensates for microphonic interference. As illustrated, the present invention may be altered by dividing the medial screen of FIG. 1 or the conductive rod of FIG. 3 into at least three different portions. Because microphonic interference would effect all three portions of the medial screen of FIG. 1 or the conductive rod of FIG. 3 simultaneously and because ionization of alpha particles would, at most, effect only two of the portions of the medial screen or conductive rod, the voltage pulses caused by microphonic interference can be eliminated by selectively eliminating those voltage pulses emanating simultaneously from all the portions of the medial screen or the conductive rod.

As illustrated in FIG. 5, medial wire screen 105 of FIG. 1 or conductive rod 305 of FIG. 3 may be divided into three different portions 36a, 36b and 36c. The output of all three portions 36a, 36b and 36c, then, may be fed through a gate circuit 700 which selectively inputs a signal to a switch 710 when all three portions 36a, 36b and 36c produce a voltage pulse simultaneously. The signal from the gate circuit 700 would inactivate the switch 710, thereby stopping the voltage pulses caused by microphonic interference from being detected by the counter circuit.

It is anticipated that there are numerous variations of the present invention with regard to the various instruments that may be activated by the relay circuit. These variations include alarm devices, both audible and visual, as well as various ventilation means proven to alleviate unsafe radon concentrations. Moreover, it is also anticipated the present invention may be utilized as a counter device with either analog or digital readout alone or in combination with the alarm or ventilation means. These variations are considered to be well known in the art and need no further elaboration.

Obviously, many modifications may be made without departing from the basic spirit of the present invention. Accordingly it is understood by those skilled in this art that, within the scope of the claims appended herein, the invention may be practiced in manners other than those specifically described herein.

What is claimed is:

1. An ambient air, real time, radon detector comprising:

a housing;

a plurality of conductive elements whereby at least a first, second and third conductive elements are carried by the housing and permit the free flow of ambient air through the housing;

means for electrically grounding the first conductive element;

a first integrated circuit electrically connected to the second conductive element which is capable of amplifying a voltage pulse emanating from the second conductive element;

a power source electrically connected to the third conductive element whereby the power source produces a voltage bias on the third conductive element with respect to the first and second conductive elements and whereby alpha particles cause ionization of the air in the housing by entering the housing and whereby the ionization of the air produces a voltage pulse within the second conductive element;

a first counter circuit electrically connected in series to the first integrated circuit which counts all amplified voltage pulses output by the integrated circuit;

a hermetically sealed housing substantially free of radon;

a plurality of conductive electrodes whereby at least a first, second and third conductive electrodes are carried by the hermetically sealed housing, the third conductive electrode being electrically connected to the power source producing a voltage bias on the third conductive electrode whereby the ionization of the air due to alpha particles produces a voltage pulse within the second conductive element;

means for grounding the first conductive electrode;

a second integrated circuit which is capable of amplifying a voltage pulse emanating from the second conductive electrode and electrically connected thereto;

a second counter circuit electrically connected in series to the second integrated circuit which counts all amplified voltage pulses output by the second integrated circuit; and means electrically connected to the first and second counter circuit for calculating the difference between the voltage pulse counts of the first counter and the second counter circuit;

wherein the second conductive element and the second conductive electrode are each divided into at least three different portions, all of said portions of the second conductive element being in series with the first integrated circuit and with means to selectively preclude voltage pulses produced by all portions of the second conductive element simultaneously from being amplified by the first integrated circuit and all of said portions of the second conductive electrode being in series with the second integrated circuit and with means to selectively preclude voltage pulses produced by all portions of the second conductive electrode simultaneously from being amplified by the second integrated circuit.

* * * * *